United States Patent [19]
Segal et al.

[11] Patent Number: 5,644,627
[45] Date of Patent: Jul. 1, 1997

[54] METHOD AND APPARATUS FOR PROCESSING A VOICE MESSAGE INTENDED FOR A SELECTIVE CALL TRANSCEIVER

[75] Inventors: Nirarjan Nath Segal, Arlington; Steven Harold Petit, North Richland Hills, both of Tex.

[73] Assignee: Motorola, Inc., Schaumburg, Ill.

[21] Appl. No.: 413,020

[22] Filed: Mar. 29, 1995

[51] Int. Cl.$^6$ .............................. H04M 1/64; H04Q 7/00
[52] U.S. Cl. ............... 379/67; 340/825.44; 340/825.48; 453/31; 455/31.2
[58] Field of Search ................... 379/67, 88, 89, 379/56, 57, 58, 59; 340/825.44, 825.48, 311.1; 453/31

[56] References Cited

U.S. PATENT DOCUMENTS

| | | | |
|---|---|---|---|
| 4,868,560 | 9/1989 | Oliwa et al. | 379/56 |
| 4,875,038 | 10/1989 | Siwiak et al. | 379/57 |
| 4,965,569 | 10/1990 | Bennett et al. | 379/56 |
| 5,153,582 | 10/1992 | Davis | 340/825.44 |
| 5,444,438 | 8/1995 | Goldberg | 340/825.44 |
| 5,463,382 | 10/1995 | Nikas et al. | 340/825.44 |
| 5,513,241 | 4/1996 | Dimitriadis et al. | 379/57 |

*Primary Examiner*—Krista M. Zele
*Assistant Examiner*—Fan Tsang
*Attorney, Agent, or Firm*—Charles W. Bethards

[57] ABSTRACT

A method and apparatus processes a voice message for a selective call transceiver (SCT) (110) in a selective call communication system. A fixed portion (100) of the system accepts and stores (602) the message, transmits (604) a message notification indicative of message size to the SCT, and transmits (608) the message to the SCT in response to receiving therefrom a first acknowledgment. The SCT receives (702) the message notification, and determines (704) whether sufficient memory space is available for storing the message. If so, the SCT transmits (706) the first acknowledgment, and thereafter receives and stores (708) the message. If not, the SCT notifies (716) the user about the memory insufficiency, and withholds (718) the first acknowledgment until an execution of a predetermined control sequence by the user within a predetermined period. If the control sequence is executed in time, the SCT sends (720) the first acknowledgment, and thereafter receives and audibly reproduces (722) the voice message without storing the voice message.

18 Claims, 6 Drawing Sheets

METHOD AND APPARATUS FOR PROCESSING A VOICE MESSAGE INTENDED FOR A SELECTIVE CALL TRANSCEIVER

FIELD OF THE INVENTION

This invention relates in general to selective call communication systems, and more specifically to a method and apparatus for processing a voice message intended for a selective call transceiver.

BACKGROUND OF THE INVENTION

Portable selective call receivers having voice storage capability have been limited in the number and length of voice messages that can be stored at once due to memory size and battery life considerations. Such selective call receivers also have incorporated a feature that allows a user to "lock" selected messages that the user considers important, so that the locked messages will not be overwritten by new incoming messages.

A problem that can occur when a user has many locked messages is that there can be insufficient memory available for storing a new incoming message. Recently introduced selective call transceivers, i.e., acknowledge-back pagers, can communicate to a fixed portion of a selective call communication system that there is insufficient memory for receiving a particular message. Unfortunately, such communications alone do not enable the user to receive the message without unlocking and overwriting a locked message, which the user may not wish to do.

Thus, what is needed is a method and apparatus that allows the user to receive a voice message without unlocking a locked message when there is insufficient memory space available in the selective call transceiver for storing the voice message.

DETAILED DESCRIPTION OF THE DRAWINGS

Figure 1:
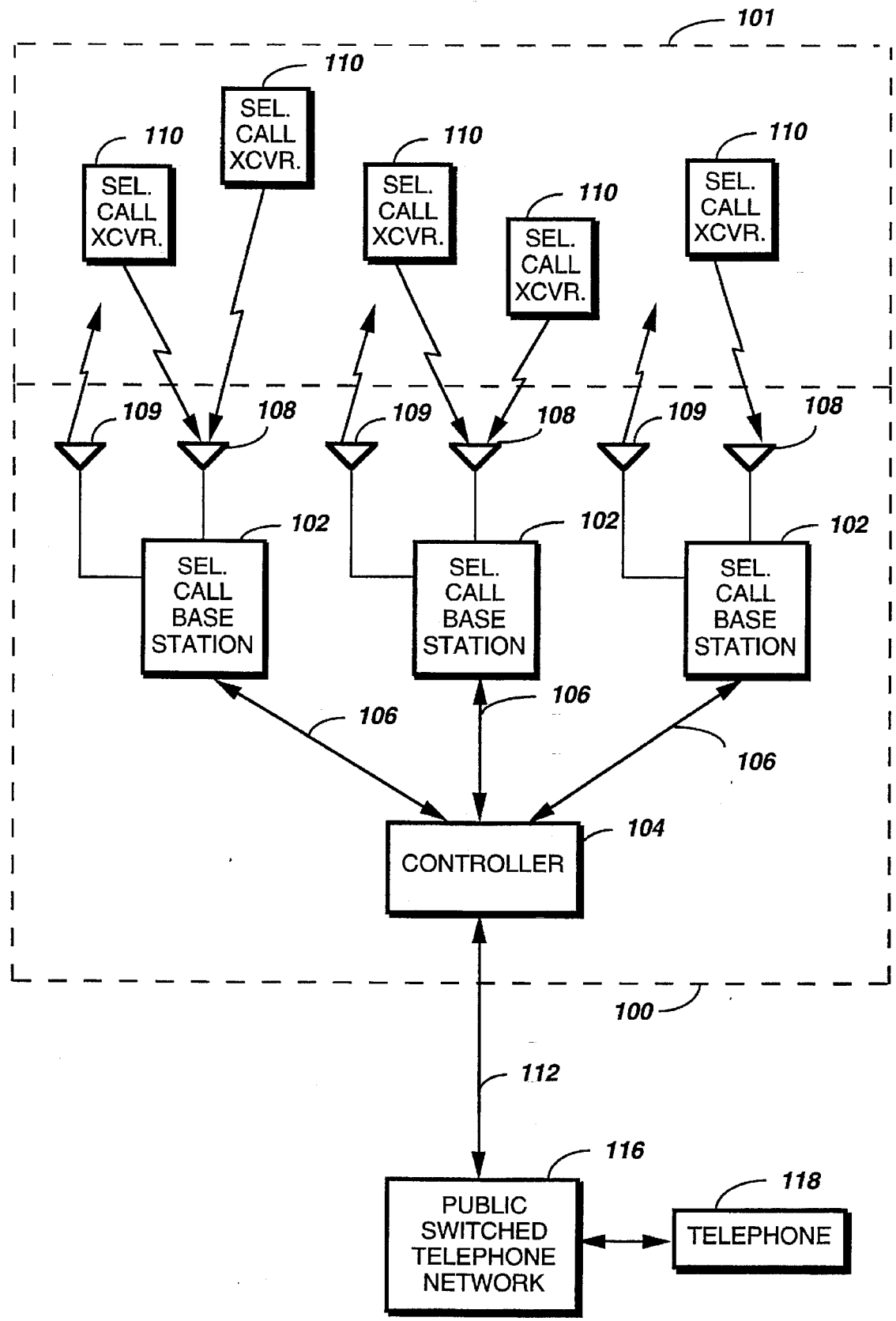
FIG. 1 is an electrical block diagram of a selective call communication system in accordance with the preferred embodiment of the present invention.

Referring to FIG. 1, an electrical block diagram of an acknowledge-back selective call communication system in accordance with the preferred embodiment of the present invention comprises a fixed portion 100 and a portable portion 101. The fixed portion comprises a plurality of conventional selective call base stations 102 coupled by communication links 106 to a controller 104 for controlling the selective call base stations 102. The hardware of the controller 104 is preferably similar to the MPS 2000™ paging control center manufactured by Motorola, Inc. of Schaumburg, Ill. Other similar controller hardware can be utilized as well for the controller 104. The controller 104 comprises a plurality of firmware elements in accordance with the preferred embodiment of the present invention, as will be described further below.

Each of the selective call base stations 102 transmits radio signals to the portable portion 101 comprising a plurality of selective call transceivers 110 via a transmitting antenna 109. The selective call base stations 102 each receive radio signals from the plurality of selective call transceivers 110 via a receiving antenna 108. The radio signals comprise selective call addresses and messages transmitted to the selective call transceivers 110 and acknowledgments received from the selective call transceivers 110. It will be appreciated that the selective call transceivers 110 can also originate messages other than acknowledgments. The controller 104 preferably is coupled to the public switched telephone network (PSTN) 116 by telephonic links 112 for receiving selective call originations therefrom. Selective call originations comprising voice messages from the PSTN 116 can be generated, for example, from a conventional telephone 118 coupled to the PSTN 116 in a manner that is well known in the art.

Data and control transmissions between the selective call base stations 102 and the selective call transceivers 110 preferably utilize a well-known digital selective call signaling protocol, such as the Motorola FLEX™ protocol. It will be appreciated that other protocols such as the Golay Sequential Code (GSC) or Motorola's new ReFLEX™ and InFLEXion™ protocols can be utilized as well. These protocols utilize well-known error detection and error correction techniques and are therefore tolerant to bit errors occurring during transmission, provided that the bit errors are not too numerous in any one code word.

Voice message transmissions preferably utilize a conventional analog single sideband amplitude modulation (SSB AM) transmission mode to conserve bandwidth. Switching between the analog voice transmission mode and the data/control digital transmission mode is performed in a manner well known in the art, e.g., by utilizing appropriate preambles and synchronization words for synchronizing the transmission modes.

Forward channel transmissions comprising data and control signals from the selective call base stations 102 preferably utilize four-level frequency shift keyed (FSK) modulation, operating at sixteen-hundred or thirty-two-hundred symbols-per-second (sps), depending on traffic requirements and system transmission gain. Reverse channel transmissions from the selective call transceivers 110 to the selective call base stations 102 preferably utilize binary FSK modulation at a rate of eight-hundred bits per second (bps). Reverse channel transmissions preferably occur during predetermined data packet time slots synchronized with the forward channel transmissions. It will be appreciated that, alternatively, other signaling protocols, modulation schemes, and transmission rates can be utilized as well for either or both transmission directions. The forward and reverse channels preferably operate on a single carrier frequency utilizing well-known time division multiplex (TDM) techniques for sharing the frequency. It will be further appreciated that, alternatively, the forward and reverse channels can operate on two different carrier frequencies without requiring the use of TDM techniques.

U.S. Pat. No. 4,875,038 to Siwiak et al., which describes a prior art acknowledge-back selective call communication system, is hereby incorporated herein by reference. For further information on the operation and structure of an acknowledge-back selective call communication system, please refer to the Siwiak et al. patent.

Figure 2:
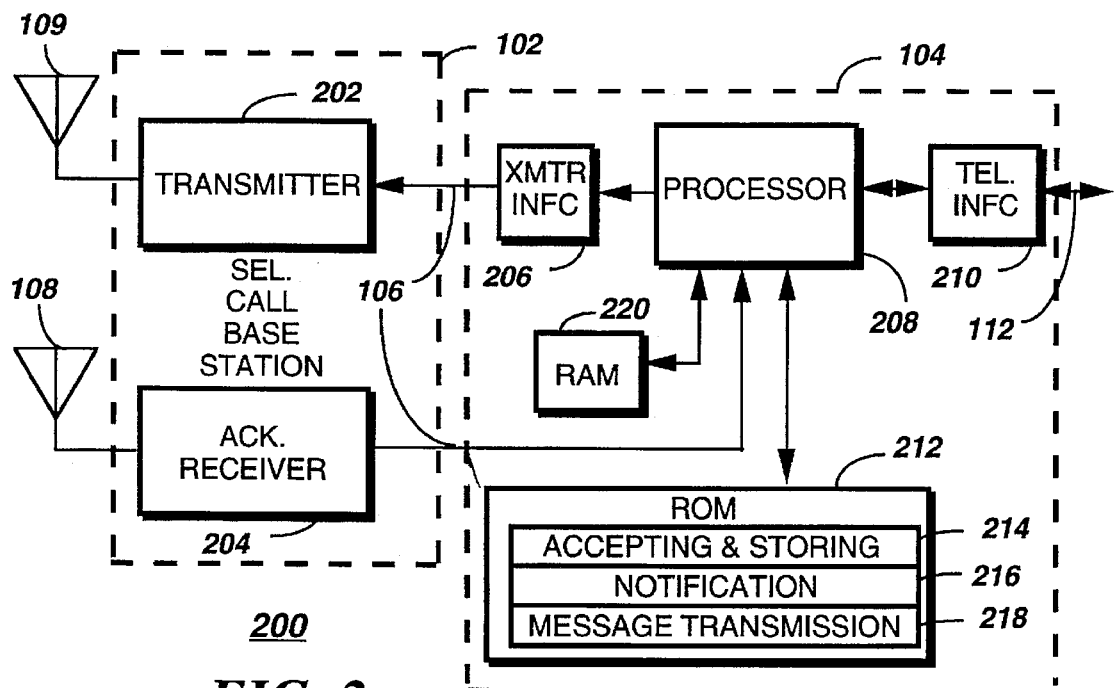
FIG. 2 is an electrical block diagram of elements of a fixed portion of the selective call communication system in accordance with the preferred embodiment of the present invention.

Referring to FIG. 2, an electrical block diagram of elements 200 of the fixed portion 100 in accordance with the preferred embodiment of the present invention comprises portions of the controller 104 and the selective call base station 102 in accordance with the preferred embodiment of the present invention. The controller 104 comprises a processor 208 for directing operation of the controller 104. The processor 208 preferably incorporates conventional digital-to-analog (D/A) and analog-to-digital converters (not shown) for converting a voice message between digital and analog formats, as required for processing and transmission, respectively. The processor 208 preferably is coupled through a conventional transmitter interface 206 to a conventional transmitter 202 capable of transmitting both four-level FSK and analog voice SSB AM for transmitting a radio signal comprising a message notification and, subsequently, a corresponding voice message to one of the selective call transceivers 110. The processor 208 is also coupled to at least one conventional binary FSK acknowledgment receiver 204. The at least one acknowledgment receiver 204 can be collocated with the selective call base station 102, as implied in FIG. 2, but preferably is positioned remote from the selective call base station 102 to avoid interference from the transmitter 202. The at least one acknowledgment receiver 204 is for receiving one or more acknowledgments from the one of the selective call transceivers 110 in response to the message notification and/or the voice message sent to the one of the selective call transceivers 110 in accordance with the embodiments of the present invention, as described in greater detail herein below.

The processor 208 also is preferably coupled to the telephonic links 112 and thence to the PSTN 116 by a telephone interface 210 for receiving therefrom a selective call origination comprising identification of a called party and a voice message intended for the selective call transceiver 110 corresponding to the called party. In addition, the processor 208 is coupled to a random access memory (RAM) 220 for storing the voice message after the voice message has been digitized and compressed by the processor 208. The processor 208 also is coupled to a read-only memory (ROM) 212 comprising firmware elements for use by the processor 208. It will be appreciated that other types of memory, e.g., electrically erasable ROM (EEROM) or magnetic disk memory, can be utilized as well for the ROM 212. It will be further appreciated that the RAM 220 and the ROM 212, singly or in combination, can be integrated as a contiguous portion of the processor 208. Preferably, the processor 208 is similar to the DSP56100 digital signal processor (DSP) manufactured by Motorola, Inc. of Schaumburg, Ill. It will be appreciated that other similar processors can be utilized as well for the processor 208, and that additional processors can be added as required to handle the processing requirements of the controller 104.

The firmware elements comprise an accepting and storing element 214 for controlling the processor 208 to accept the digitized voice message from the telephone interface 210. The processor 208 then preferably compresses the voice message in a conventional manner, and then stores the compressed and digitized voice message in the RAM 220. The firmware elements further comprise a notification element 216 for controlling the processor 208 to transmit via the transmitter 202 in response to storing the voice message a message notification indicative of message size to the selective call transceiver 110 corresponding to the called party. Preferably, the notification includes the selective call address of the selective call transceiver, and the message size is indicated by a numeric value corresponding to the amount of memory required to store the voice message after digitization. It will be appreciated that, alternatively, the message size can be indicated by the length of the voice message in seconds. Furthermore, if the selective call transceiver utilizes a fixed amount of storage for each voice message, then the notification need not explicitly transmit the message size, as the memory requirements for each message can be pre-programmed into the selective call transceiver.

The firmware elements also include a message transmission element 218 for controlling the processor 208 and the transmitter interface 206 to convert the compressed and digitized voice message into analog form, and to transmit the voice message to the selective call transceiver 110. The conversion and transmission of the voice message is done in response to receiving from the selective call transceiver 110 a first acknowledgment comprising a request to transmit the voice message.

Figure 3:
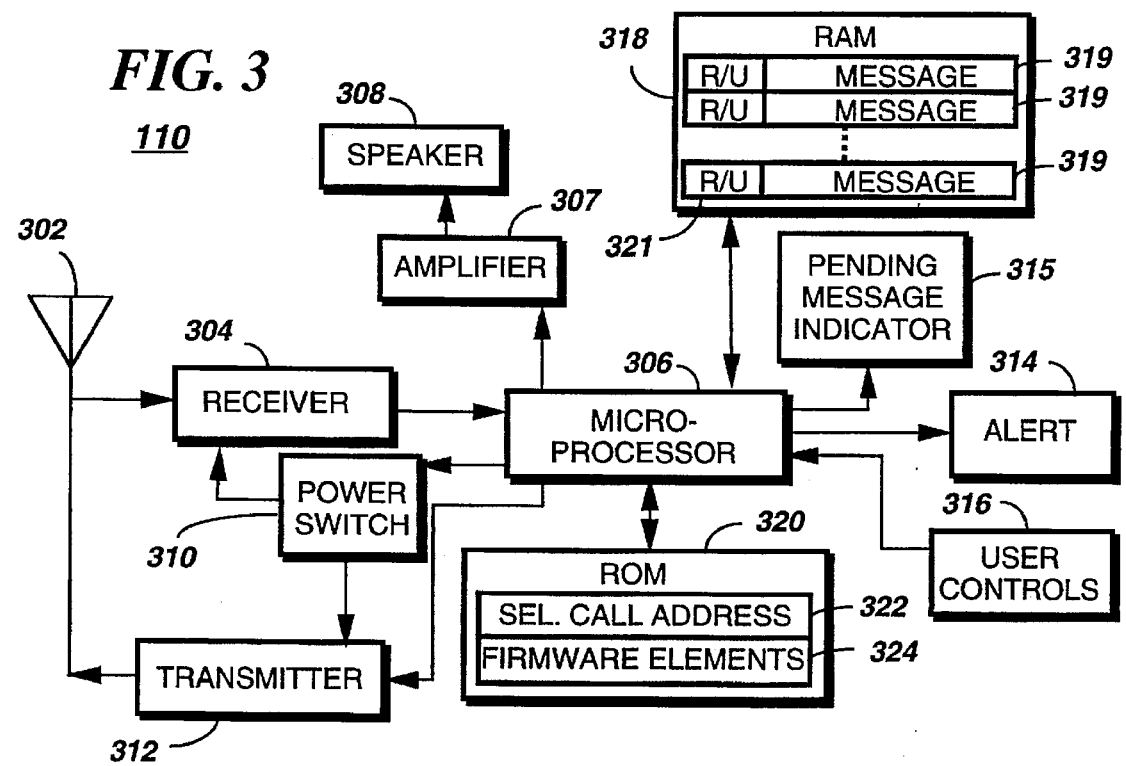
FIG. 3 is an electrical block diagram of a selective call transceiver in accordance with the preferred embodiment of the present invention.

Referring to FIG. 3, an electrical block diagram of the selective call transceiver 110 in accordance with the preferred embodiment of the present invention comprises an antenna 302 for intercepting the transmitted radio signals, which are coupled to the input of a conventional four-level FSK and analog SSB AM receiver 304. The radio signals are preferably selective call (paging) signals which provide, for example, a receiver address and an associated voice message.

The receiver 304 processes the radio signals and produces at the output demodulated information. The demodulated information is coupled into the input of a microprocessor 306, which processes the information in a manner well known in the art. Preferably, the microprocessor 306 incorporates conventional analog-to-digital (A/D) and digital-to-analog converters (not shown) for digitizing the analog voice message from the receiver 304 and for reproducing the analog voice message for audible playback. A transmitter 312 is coupled to the antenna 302 and to the microprocessor 306 for sending an acknowledgment in response to receiving a message notification intended for the selective call transceiver 110. The transmitter 312 is preferably a conventional binary FSK transmitter operating at a symbol rate of eight-hundred bps. It will be appreciated that other modulation techniques and symbol rates can be used as well for the transmitter 312.

A conventional power switch 310, coupled to the microprocessor 306, is used to control the supply of power to the receiver 304, thereby providing a battery saving function, and to the transmitter 312 for controlling power thereto. When a selective call address is received by the microprocessor 306, the received address is compared with one or more selective call addresses 322 stored in a ROM 320, and when a match is detected, a call alerting signal is generated to alert a user that a voice message is pending. In addition, a pending message indicator 315, e.g., a conventional light emitting diode (LED) or liquid crystal display (LCD) icon, is activated. It will be appreciated that other types of memory, e.g., electrically erasable ROM (EEROM), can be utilized as well for the ROM 320. The call alerting signal is directed to a conventional audible or tactile alerting device 314 for generating an audible or tactile call alerting signal. Conventional user controls 316 allow a user of the selective call transceiver 110 to, among other things, select between the audible call alerting signal and the tactile call alerting signal in a manner well known in the art.

The voice message which is subsequently received is digitized in a conventional manner and then is stored in a message location 319 of a pager random access memory (RAM) 318, and can be accessed by the user for audible playback using the user controls 316, which provide such additional functions as lock, unlock, delete, etc. More specifically, by the use of appropriate functions provided by the user controls 316, the message is recovered from the RAM 318, and then decompressed and converted to analog by the microprocessor 306 for audible playback through a conventional speaker 308 after being amplified by a conventional audio amplifier 307. Also included in the RAM 318 is a read/unread flag 321 corresponding to each message location 319 for indicating whether or not the user has played, and thus presumably heard, the voice message stored therein.

The receipt and playback of the voice message by the selective call transceiver 110 can automatically generate an acknowledgment response to the selective call base station 102, as will be explained further below. The acknowledgment response preferably is transmitted at a time synchronized with the radio signals received from the selective call base station 102 that originated the message, by techniques well known to one of ordinary skill in the art.

The microprocessor 306 preferably is similar to the DSP56100 digital signal processor (DSP) manufactured by Motorola, Inc. of Schaumburg, Ill. It will be appreciated that other similar DSPs can be utilized as well for the microprocessor 306, and that additional microprocessors, e.g., the MC68HC05 series microcomputer, manufactured by Motorola, Inc. of Schaumburg, Ill., can be utilized also, as required to handle the processing requirements of the selective call transceiver 110. It will be appreciated that the RAM 318 and the ROM 320 also can be included as a portion of the microprocessor 306. It will be further appreciated that other types of memory, e.g., electrically erasable programmable read-only memory (EEPROM) or flash memory can be utilized as well for the RAM 318. The ROM 320 includes firmware elements 324 utilized by the microprocessor 306 for controlling the selective call transceiver 110 in accordance with the preferred embodiment of the present invention.

Figure 4:
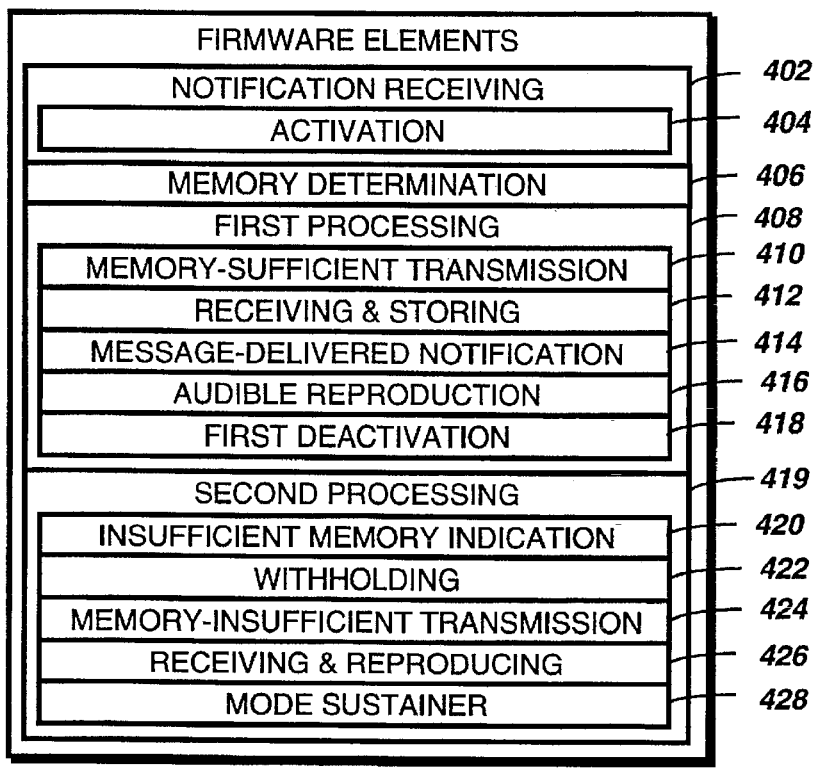
FIG. 4 is a diagram of firmware elements of the selective call transceiver in accordance with the preferred embodiment of the present invention.

Referring to FIG. 4, a diagram depicts the firmware elements 324 of the selective call transceiver 110 in accordance with the preferred embodiment of the present invention. The firmware elements 324 include a notification receiving element 402 for cooperating with the microprocessor 306 to receive a message notification from the fixed portion of the selective call communication system. The notification receiving element 402 includes an activation element 404 for activating the pending message indicator 315 in response to receiving the message notification.

The firmware elements 324 further comprise a memory determination element 406 for determining whether sufficient memory space is available in the selective call transceiver 110 for storing the voice message therein. In addition, the firmware elements 324 include a first processing element 408 for processing the voice message in a first manner in response to determining that sufficient memory space is available for storing the voice message. The first processing element 408 comprises a memory-sufficient transmission element 410 for transmitting a first acknowledgment in response to the message notification when sufficient memory space is available. The first processing element 408 further comprises a receiving and storing element 412 for receiving and storing the voice message. The first processing element 408 also includes a message-delivered notification element 414 for transmitting a second acknowledgment comprising a message-delivered notification in response to completing receiving and storing of the voice message. The second acknowledgment optionally can be stored in a database of the fixed portion 100 of the system and accessed by a caller to determine whether a message has been delivered to the selective call transceiver 110. In addition, the first processing element 408 includes an audible reproduction element 416 for cooperating with the microprocessor 306 to audibly reproduce the stored voice message in response to a second predetermined control sequence by the user on the user controls 316. The first processing element 408 further comprises a first deactivation element 418 for deactivating the pending message indicator 315 and transmitting a third acknowledgment comprising a message-played notification in response to audibly reproducing the voice message. The third acknowledgment optionally can be stored in a database of the fixed portion 100 of the system and accessed by a caller to determine whether a message has been played, and presumably heard, by the user of the selective call transceiver 110.

The firmware elements 324 further comprise a second processing element 419 for processing the voice message in a second manner in response to determining that sufficient memory space is not available. The second processing element 419 comprises an insufficient memory indication element 420 for providing an indication to the user of the selective call transceiver that there is insufficient memory available for storing the voice message. Preferably the insufficient memory indication is in the form of a special audible or tactile alert from the alerting device 314. The second processing element 419 further comprises a withholding element 422 for withholding the first acknowledgment in the absence of an execution of a first predetermined control sequence by the user on the user controls 316 within a predetermined period after providing the insufficient memory indication. The second processing element 419 also includes a memory-insufficient transmission element 424 for transmitting the first acknowledgment in response to the execution of the first predetermined control sequence by the user on the user controls 316 within the predetermined period. In addition, the second processing element 419 includes a receiving and reproducing element 426 for receiving and audibly reproducing the voice message through the speaker 308 without storing the voice message within the selective call transceiver 110. The second processing element 419 further comprises a mode sustainer element 428 for leaving the pending message indicator 315 active and withholding transmission of the third acknowledgment comprising the message-played notification in response to audibly reproducing the voice message. Withholding transmission of the third acknowledgment leaves the voice message as "pending" in the system, so that it can be retransmitted by the fixed portion 100 for storage in the selective call transceiver 110 at a later time.

Figure 5:
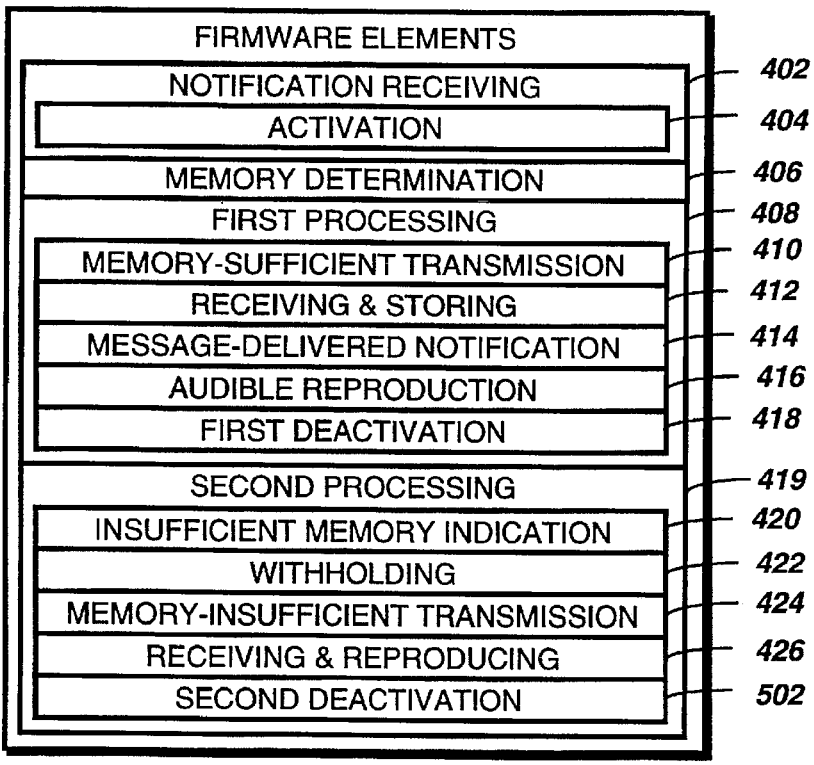
FIG. 5 is a diagram of firmware elements of the selective call transceiver in accordance with an alternative embodiment of the present invention.

Referring to FIG. 5, a diagram depicting firmware elements 500 of the selective call transceiver 110 in accordance with an alternative embodiment of the present invention is similar to the diagram of the firmware elements 324, the essential difference being the replacement of the mode sustainer element 428 by the second deactivation element 502. The second deactivation element is for deactivating the pending message indicator 315 and transmitting a third acknowledgment comprising a message-played notification in response to audibly reproducing the voice message. This provides an alternative form of operation, in which the voice message is no longer considered "pending" after it has been played by the user without storing.

Figure 6:
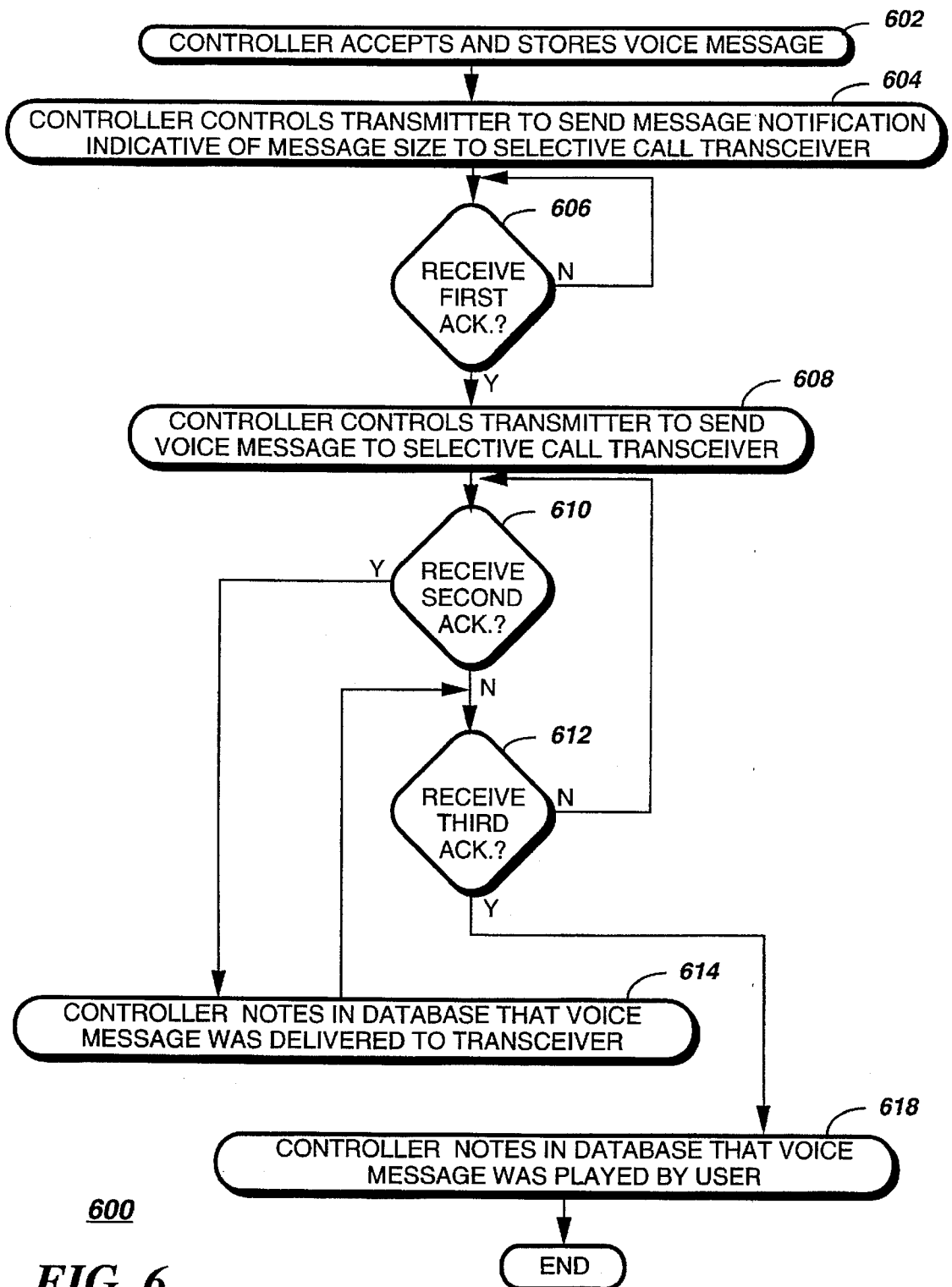
FIG. 6 is a flow chart depicting operation of the controller in accordance with the preferred embodiment of the present invention.

Referring to FIG. 6, a flow chart depicting operation of the controller 104 in accordance with the preferred embodiment of the present invention begins with the controller 104 accepting from a caller and storing 602 a voice message intended for a selective call transceiver 110 corresponding to a called party identified by the caller. The controller 104 then controls 604 the transmitter 202 to send a message notification indicative of the message size to the selective call transceiver 110 corresponding to the called party. The controller 104 then awaits 606 a first acknowledgment from the selective call transceiver 110, comprising a request to transmit the voice message. After the first acknowledgment is received by the acknowledgment receiver 204, the controller 104 controls 608 the transmitter 202 to send the voice message to the selective call transceiver 110.

Next, the controller 104 checks 610 whether a second acknowledgment was received from the selective call transceiver 110. If so, the controller notes 614 in a database of the RAM 220 that the voice message was delivered to the selective call transceiver 110, and then the controller 104 checks 612 whether a third acknowledgment was received from the selective call transceiver 110. If, on the other hand, in step 610 no second acknowledgment was received, then the controller 104 proceeds immediately to step 612. If in step 612 if no third acknowledgment was received, then flow returns to step 610. If on the other hand, in step 612 the third acknowledgment was received, then the controller 104 notes 618 in the database of the RAM 220 that the voice message was played by the user, and the process ends.

Figure 7:
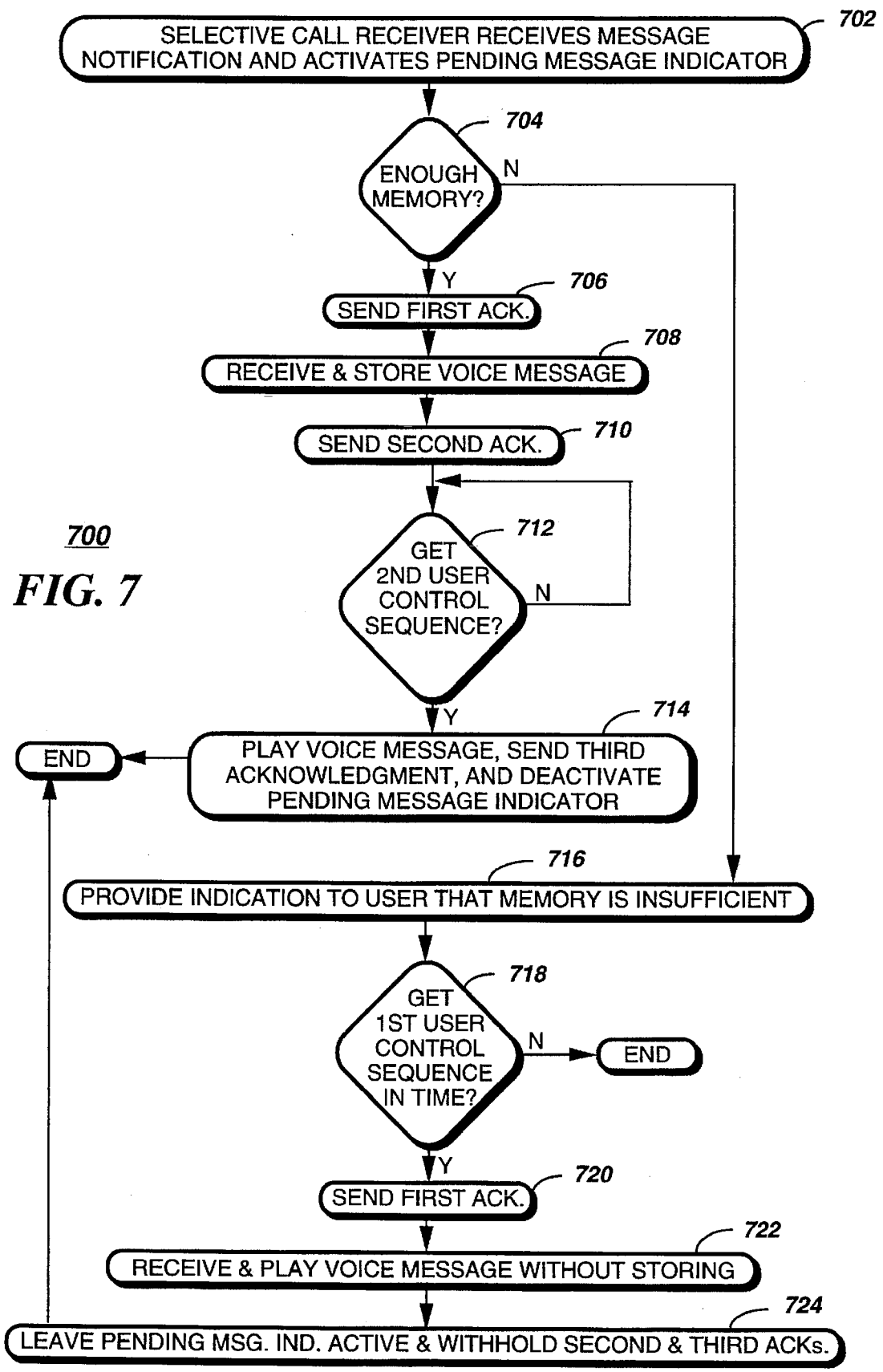
FIG. 7 is a flow chart depicting operation of the selective call transceiver in accordance with the preferred embodiment of the present invention.

Referring to FIG. 7, a flow chart 700 depicting operation of the selective call transceiver 110 in accordance with the preferred embodiment of the present invention begins with the selective call transceiver receiving 702 a message notification of a voice message indicative of message size, and in response, activating the pending message indicator 315. The microprocessor 306 then checks whether there is sufficient memory space in the RAM 318 for storing the voice message. If not, the microprocessor 306 provides 716 an alert to the user that the memory is insufficient to store a pending voice message, and then waits 718 for a response from the user within a predetermined time period, e.g., fifteen seconds. If the user does not execute a first predetermined user control sequence within the predetermined time period, the process ends.

If, however, the user executes the first predetermined user control sequence within the predetermined time period, then the microprocessor 306 controls the transmitter 312 to send 720 a first acknowledgment comprising a request for transmission of the voice message. When the fixed portion 100 transmits the voice message, the microprocessor 306 controls the selective call transceiver 110 to receive and audibly play 722 the voice message without storing the message in the RAM 318, thereby advantageously allowing the voice message to be heard although insufficient memory space is available for storing the voice message in the selective call transceiver. Then the microprocessor 306 leaves 724 the pending message indicator 315 active, and withholds sending of second and third acknowledgments comprising a message-delivered notification and a message-played notification, respectively. In this manner, the voice message is kept as "pending" by the fixed portion 100, and can be retransmitted later for storage in the selective call transceiver 110 if memory space becomes available.

If, on the other hand, sufficient memory space is determined to be available in step 704, then the microprocessor 306 controls the transmitter 312 to send 706 the first acknowledgment comprising the request for transmission of the voice message. When the fixed portion 100 transmits the voice message, the microprocessor 306 controls the selective call transceiver 110 to receive and store 708 the voice message, after which the microprocessor 306 controls the transmitter 312 to send 710 the second acknowledgment comprising the message-delivered notification. The microprocessor 306 then awaits 712 a second predetermined user control sequence. When the second predetermined user control sequence is executed, the microprocessor 306 controls the selective call transceiver 110 to audibly play 714 the previously stored voice message, to send the third acknowledgment comprising the message-delivered notification and the message-played notification, and to deactivate the pending message indicator 315.

Figure 8:
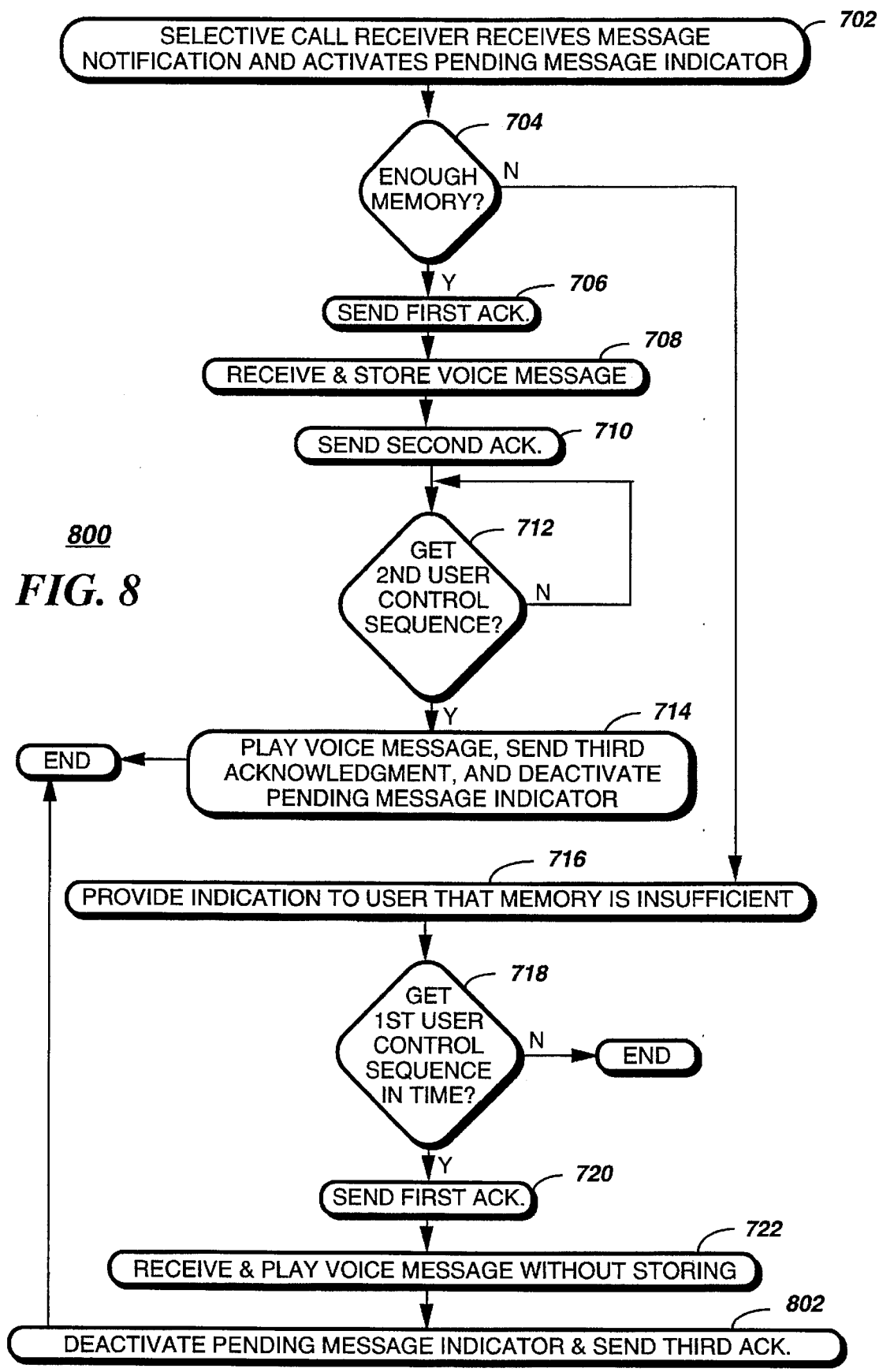
FIG. 8 is a flow chart depicting operation of the selective call transceiver in accordance with the alternative embodiment of the present invention.

Referring to FIG. 8, a flow chart 800 depicting operation of the selective call transceiver 110 in accordance with the alternative embodiment of the present invention is similar to the flow chart 700, the essential difference being that following step 722, step 724 has been replaced by step 802. In step 802, the microprocessor 306 controls the selective call transceiver 110 to deactivate the pending message indicator 315 and send the third acknowledgment after the voice message has been played without storing. In this manner, the status of the voice message is changed from "pending" to "played" in the database of the fixed portion 100.

Thus, it should have become apparent by now that the present invention provides a method and apparatus that advantageously allows a voice message to be played by a selective call transceiver under the control of the user, even though the selective call transceiver has insufficient memory space available to store the voice message and play back the stored message in the usual manner by reading the stored message from the memory.

What is claimed is:

1. A method of processing a voice message intended for a selective call transceiver in a selective call communication system, the method comprising in a fixed portion of the selective call communication system the steps of:
  accepting and storing the voice message;
  transmitting a message notification indicative of message size to the selective call transceiver; and
  transmitting the voice message to the selective call transceiver in response to receiving therefrom a first acknowledgment comprising a request to transmit the voice message, and the method further comprising in the selective call transceiver the steps of:
  receiving the message notification;
  determining in response whether sufficient memory space is available in the selective call transceiver for storing the voice message therein; and
  processing the voice message in a first manner in response to determining that sufficient memory space is available, comprising the steps of:
    transmitting the first acknowledgment; and
    thereafter receiving and storing the voice message,
  wherein the method further comprises in the selective call transceiver the step of processing the voice message in a second manner in response to determining that sufficient memory space is not available, comprising the steps of:

provided an indication to a user of the selective call transceiver that there is insufficient memory available for storing the voice message;

withholding the first acknowledgment in an absence of an execution of a first predetermined control sequence by the user within a predetermined period after providing the indication;

transmitting the first acknowledgment in response to the execution of the first predetermined control sequence by the user within the predetermined period; and thereafter receiving and audibly reproducing the voice message without storing the voice message within the selective call transceiver.

2. The method of claim 1, wherein the step of processing the voice message in the first manner further comprises the step of transmitting a second acknowledgment comprising a message-delivered notification in response to completing the step of receiving and storing the voice message.

3. The method of claim 1, wherein the selective call transceiver includes a pending message indicator, and wherein the step of receiving the message notification comprises the step of activating the pending message indicator.

4. The method of claim 3, wherein the step of processing the voice message in the first manner further comprises the steps of:

audibly reproducing the voice message in response to a second predetermined control sequence by the user; and thereafter deactivating the pending message indicator and transmitting a third acknowledgment comprising a message-played notification.

5. The method of claim 3, wherein the step of processing the voice message in the second manner further comprises the steps of:

deactivating the pending message indicator and transmitting a third acknowledgment comprising a message-played notification in response to audibly reproducing the voice message.

6. The method of claim 3, wherein the step of processing the voice message in the second manner further comprises the steps of:

leaving the pending message indicator active and withholding transmission of a third acknowledgment comprising a message-played notification in response to audibly reproducing the voice message.

7. An apparatus for processing a voice message intended for a selective call transceiver in a selective call communication system, the apparatus comprising in a fixed portion of the selective call communication system:

accepting and storing means for accepting and storing the voice message;

notification means coupled to the accepting and storing means for transmitting a message notification indicative of message size to the selective call transceiver;

acknowledgment receiver means communicating with the selective call transceiver for receiving acknowledgments therefrom; and message transmission means coupled to the acknowledgment receiver means for transmitting the voice message to the selective call transceiver in response to receiving therefrom a first acknowledgment comprising a request to transmit the voice message, and the apparatus further comprising in the selective call transceiver:

receiver means for receiving the voice message transmitted by the message transmission means;

memory means coupled to the receiver means for storing the voice message;

processor means coupled to the receiver means and coupled to the memory means for controlling the selective call transceiver;

transmitter means coupled to the processor means for transmitting the acknowledgments to the fixed portion of the selective call communication system;

user control means coupled to the processor means for providing control of the selective call transceiver by a user;

notification receiving means coupled to the processor means for receiving the message notification;

memory determination means coupled to the notification receiving means and coupled to the memory means for determining whether sufficient memory space is available in the selective call transceiver for storing the voice message therein; and first processing means coupled to the memory determination means for processing the voice message in a first manner in response to determining that sufficient memory space is available, the first processing means comprising:

memory-sufficient transmission means for transmitting the first acknowledgment; and receiving and storing means coupled to the memory means for receiving and storing the voice message, wherein the apparatus further comprises in the selective call transceiver a second processing means coupled to the memory determination means for processing the voice message in a second manner in response to determining that sufficient memory space is not available, the second processing means comprising:

insufficient memory indication means for providing an indication to the user of the selective call transceiver that there is insufficient memory available for storing the voice message;

withholding means coupled to the insufficient memory indication means and coupled to the user control means for withholding the first acknowledgment in an absence of an execution of a first predetermined control sequence by the user within a predetermined period after providing the indication;

memory-insufficient transmission means coupled to the processor means for transmitting the first acknowledgment in response to the execution of the first predetermined control sequence by the user within the predetermined period; and receiving and reproducing means coupled to the processor means for receiving and audibly reproducing the voice message without storing the voice message within the selective call transceiver.

8. The apparatus of claim 7, wherein the first processing means further comprises message-delivered notification means coupled to the receiving and storing means for transmitting a second acknowledgment comprising a message-delivered notification in response to completing receiving and storing of the voice message.

9. The apparatus of claim 7, wherein the selective call transceiver includes a pending message indicator, and wherein the notification receiving means comprises an activation means coupled to the pending message indicator for activating the pending message indicator in response to receiving the message notification.

10. The apparatus of claim 9, wherein the first processing means further comprises:

audible reproduction means for audibly reproducing the voice message in response to a second predetermined control sequence by the user; and first deactivation means coupled to the pending message indicator for deactivating the pending message indicator and transmitting a third acknowledgment comprising a message-played notification in response to audibly reproducing the voice message.

11. The apparatus of claim 9, wherein the second processing means further comprises:

second deactivation means coupled to the pending message indicator for deactivating the pending message indicator and transmitting a third acknowledgment comprising a message-played notification in response to audibly reproducing the voice message.

12. The apparatus of claim 9, wherein the second processing means further comprises:

mode sustainer means coupled to the pending message indicator for leaving the pending message indicator active and withholding transmission of a third acknowledgment comprising a message-played notification in response to audibly reproducing the voice message.

13. A selective call transceiver for processing a voice message intended therefor and transmitted from a fixed portion of a selective call communication system, the selective call transceiver comprising:

a receiver element for receiving the voice message;

a memory coupled to the receiver element for storing the voice message;

a processor coupled to the receiver element and coupled to the memory for controlling the selective call transceiver;

a transmitter coupled to the processor for transmitting acknowledgments to the fixed portion of the selective call communication system;

user controls coupled to the processor for providing control of the selective call transceiver by a user;

a notification receiving element coupled to the processor for receiving a message notification from the fixed portion of the selective call communication system;

a memory determination element coupled to the notification receiving element and coupled to the memory for determining whether sufficient memory space is available in the selective call transceiver for storing the voice message therein; and a first processing element coupled to the memory determination element for processing the voice message in a first manner in response to determining that sufficient memory space is available, the first processing element comprising:

a memory-sufficient transmission element for transmitting a first acknowledgment; and a receiving and storing element coupled to the memory for receiving and storing the voice message, wherein the selective call transceiver further comprises a second processing element coupled to the memory determination element for processing the voice message in a second manner in response to determining that sufficient memory space is not available, the second processing element comprising:

an insufficient memory indication element for providing an indication to the user of the selective call transceiver that there is insufficient memory available for storing the voice message;

a withholding element coupled to the insufficient memory indication element and coupled to the user controls for withholding the first acknowledgment in an absence of an execution of a first predetermined control sequence by the user within a predetermined period after providing the indication;

a memory-insufficient transmission element coupled to the processor for transmitting the first acknowledgment in response to the execution of the first predetermined control sequence by the user within the predetermined period; and a receiving and reproducing element coupled to the processor for receiving and audibly reproducing the voice message without storing the voice message within the selective call transceiver.

14. The selective call transceiver of claim 13, wherein the first processing element further comprises a message-delivered notification element coupled to the receiving and storing element for transmitting a second acknowledgment comprising a message-delivered notification in response to completing receiving and storing of the voice message.

15. The selective call transceiver of claim 13, wherein the selective call transceiver includes a pending message indicator, and wherein the notification receiving element comprises an activation element coupled to the pending message indicator for activating the pending message indicator in response to receiving the message notification.

16. The selective call transceiver of claim 15, wherein the first processing element further comprises:

an audible reproduction element for audibly reproducing the voice message in response to a second predetermined control sequence by the user; and a first deactivation element coupled to the pending message indicator for deactivating the pending message indicator and transmitting a third acknowledgment comprising a message-played notification in response to audibly reproducing the voice message.

17. The selective call transceiver of claim 15, wherein the second processing element further comprises:

a second deactivation element coupled to the pending message indicator for deactivating the pending message indicator and transmitting a third acknowledgment comprising a message-played notification in response to audibly reproducing the voice message.

18. The selective call transceiver of claim 15, wherein the second processing element further comprises:

a mode sustainer element coupled to the pending message indicator for leaving the pending message indicator active and withholding transmission of a third acknowledgment comprising a message-played notification in response to audibly reproducing the voice message.

* * * * *